Aug. 19, 1958     J. N. PRESTON     2,848,712
AUTOMATIC SLEEP-WARNING SYSTEM DEVICE FOR AUTOMOBILES
Filed Aug. 12, 1957

INVENTOR.
James N. Preston

2,848,712
AUTOMATIC SLEEP-WARNING SYSTEM DEVICE FOR AUTOMOBILES

James N. Preston, Phoenix, Ariz.

Application August 12, 1957, Serial No. 677,634

2 Claims. (Cl. 340—279)

This invention relates to an awakener for automobile drivers.

The device is of the type wherein an alarm is sounded automatically whenever the normal functions of driving are discontinued for a predetermined period of time.

Heretofore awakeners have been made wherein the alarm was sounded when the driver's head assumed a position incompetent with correct alert driving. Most of these devices had alarms which were sounded or otherwise actuated by a nodding head movement of the driver.

One of the objects of this invention is to provide an alarm which will sound whenever the normal motion of the steering wheel, as in normal driving, ceases;

Another object of the invention is to provide a device which can be attached to the steering wheel and which will control electrical currents which, when coupled with a timing element will prevent an alarm from being sounded so long as the steering wheel is moved in either direction within a predetermined time, but will sound the alarm whenever the normal motion of correct steering is stopped for an appreciable predetermined time;

Still another object is to provide an awakener which will sound an alarm whenever back and forth rotative motion of the steering wheel ceases for a predetermined time; said device including a mercury contact operating in an arcuate channel in an attachment on the steering wheel and a timing device connected in circuit with an electrical battery and signal.

Other objects will appear hereinafter.

I attain the foregoing objects by means of the devices, parts, combinations of parts and particular devices, shown in the accompany drawings in which—

Similar numerals refer to similar parts in the several views.

Figure 3:
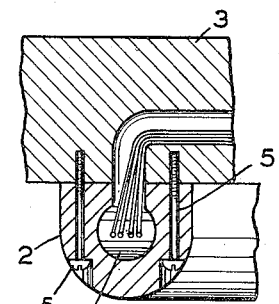
Figure 3 is a section taken through the switch body and a portion of the steering wheel and viewed substantially on line 3—3 of Figure 2.

The switch body 2 is positioned beneath spokes 3 of the steering wheel 4, as shown particularly in Figure 3, wherein screws 5 are inserted through the switch body and extend up into the spokes 3 of the steering wheel on each side of the hub 7. The body of the switch 2 may be made of any suitable insulation material and is moulded or otherwise provided with a channel 8 approximately in its center. This channel is arcuate and contains a blob of mercury 9. On the inner portion 10 of the material surrounding channel 8 there is a conductor 12 moulded or otherwise set into the material at 10. At intervals along the length of this conductor there are short contact wires 14 which extend radially outward from the conductor 12 and into the channel 8 so as to contact the upper surface of the mercury 9.

In the outside portion 16 of the body 2 there are three conductor wires marked A, B, and C respectively. The conductor A has contacts A-1 which extend radially inward to and slightly beyond the surface of the channel 8 so as to afford contact points for mercury 9. At intervals alternating the contacts A-1 there are radially inwardly extending contact points B-1 which provide contacts for the mercury and at interspaced alternate intervals there are similar contacts indicated by numeral C-1 which are connected to conductor C.

Figure 1:
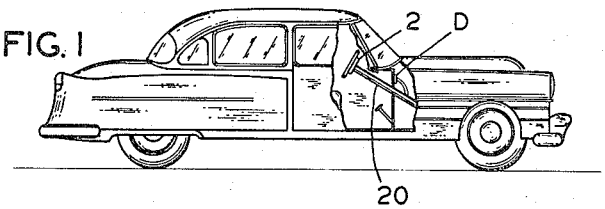
Figure 1 is a side elevational view of an automobile with parts of the outside broken away to show the interior and the place of installation of my improved alarm.
Figure 4:
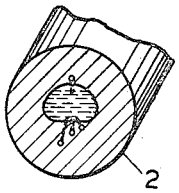
Figure 4 is a sectional view of the switch body taken substantially on line 4—4 of Figure 2.
Figure 2:
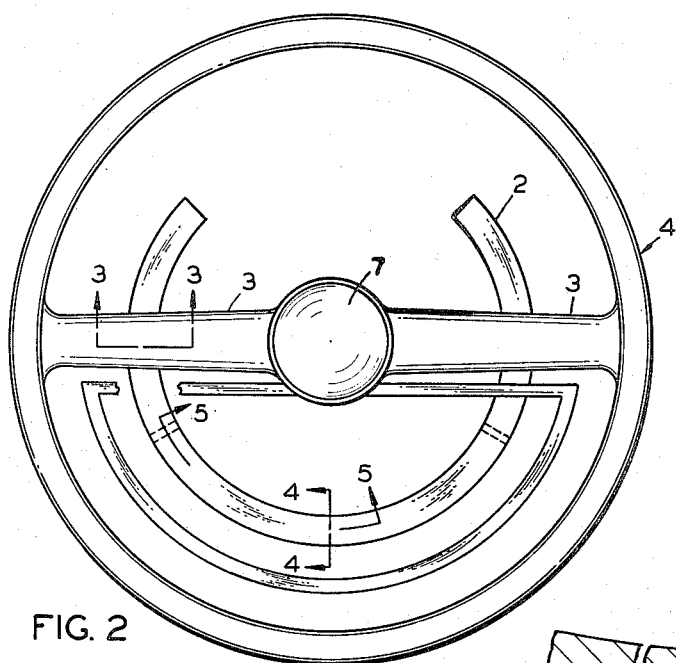
Figure 2 is a plan view of a steering wheel equipped with an arcuate switch body having an arcuate channel containing mercury making contacts with a plurality of electrical contacts within the arcuate switch body.
Figure 6:
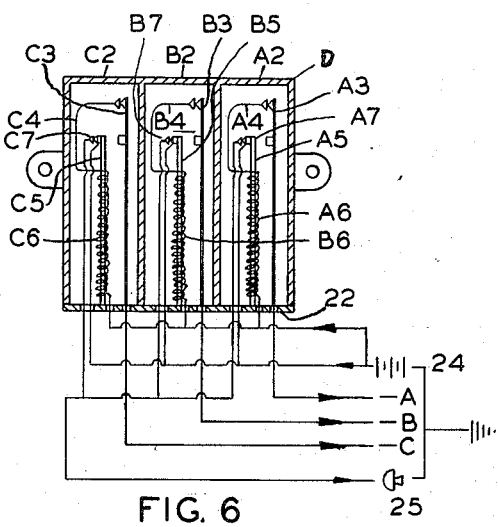
Figure 6 is a semi-diagrammatic view of three part timer switch used in connection with the electrical circuits operating a warning signal and actuated by the mercury switch attached to the steering wheel.

Conductor 12 is attached to the ground or car body as indicated at 17. Conductor A is led out from the portion 16 in which it is embedded and carried from the steering wheel to a stationary portion of the steering post as indicated in Figure 1 at 20 and thence connected to a thermostatic switch D at portion A-2 in Figure 6.

Figure 5:
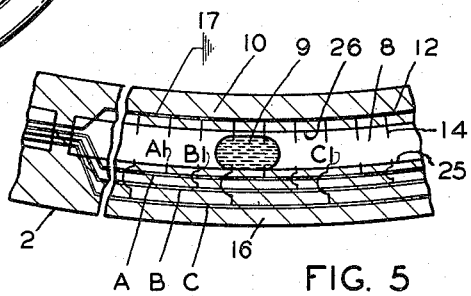
Figure 5 is a section taken through a portion of the switch body as viewed along 5—5 of Figure 2.

Conductor B is similarly led out from the portion 16 of Figure 5 to and connected with a thermostatic switch D at portion marked generally B-2. Similarly, conductor C is connected to the thermostatic switch portion marked generally as C-2. It is to be noted that each of these conductors, when brought into their respective portions of the several switches, are connected first to a contact indicated as A-3, B-3, and C-3, respectively. The other side of each of these contacts, such as A-4, B-4, and C-4, respectively, are led to resistance heating wires coiled around but out of electrical contact with bimetallic thermostat arms A-5, B-5, and C-5. The lower ends of these arms are attached solidly to the base 22 of the switch case D. The lower end of each of the heating coils, such as A-6, B-6, and C-6, respectively, are connected to the battery marked 24 in Figure 6.

At the free ends of each of the thermostat arms there are switch contacts marked A-7, B-7, and C-7, respectively, which connect to the hot side of the battery 24, and to the signal horn 25 which is independently connected to the grounded side of battery 24.

The parts are arranged so that whenever the mercury blob 9 contacts any adjacent two contacts on the outer face 25 of channel 8 and any two of the grounded contacts on the inner face 26 of channel 8, the heating coils A-6, B-6 or C-6 in circuit with the two outer contacts are energized and cause the switches A-7, B-7, or C-7 (whichever two are contacted by the mercury) to heat and keep the contacts open.

The uncontacted and unconnected heating coil will cool off and eventually (within a predetermined time) close its contact including battery 24 and horn 25 and will sound the horn alarm.

If, however, before the uncontacted and unconnected heating coil cools sufficiently to close its alarm connected contact it becomes energized by the closing of its circuit to the mercury blob then it will stay open and one of the other heating coils, which is not contacted by the mercury, will start to cool off and if left uncontacted a predetermined length of time will cool off sufficiently to sound the alarm horn through the closed contact, such as A-7, B-7, or C-7.

In normal driving the wheel is always shifted to the right or left as may be necessary to maintain the car in a straight or curved line according to road conditions. This constant motion of the wheel to the left or to the right is one of the characteristics of properly attended driving. Whenever the right and left steering motions of the wheel ceases it is due to freezing of the proper steering management of the driver. This occurs when the driver momentarily dozes or blacks out due to fatigue or hypnosis. I have found that whenever drivers go to sleep in this way they invariably freeze onto the steering wheel and it consequently remains stationary. In such a case the blob of mercury would contact only two of the contacts leading to the thermostatic switches for a period long enough so that the third switch portion cools off and therefore closes the contacts operated by the thermostatic arm and sounds the alarm. The alarm horn may be of any type desired, either making use of the horn on the automobile or a separate horn or buzzer installed in the driving compartment. In case the alarm is sounded and the driver wakens he immediately starts to shift the steering wheel to correct the path of the automobile and thus reheats the thermostatic arm which has cooled off and thereby opens the switch which has sounded the alarm.

I claim:

1. An awakener for drivers of vehicles having a steering wheel and a battery composed of an arcuate switch body of insulating material attached to said steering wheel having an inner arcuate channel, a live conductor attached to the one terminal of a battery in said vehicle within the material of said switch body having a plurality of spaced radial contact points extending into said channel, three separates conductors embedded in the material of said switch each having radially directed contact points extending into said channel; said contact points being equally spaced and extending alternately from said conductors, a blob of mercury in said channel adapted to connect any two of the contact points of said live conductor with any two adjacent contact points of said three conductors; when said steering wheel and switch body is rotatively moved, a thermostat switch having three bimetallic thermostatic arms adapted to open three normally closed alarm switches; each bar having an electric heating coil adapted to heat and bend said bar and open the alarm switch opearted by it when current is applied to said heating coil and said bar being adapted to return to normal shape and close said switch within a predetermined time when current is disconnected from said heating coil; each of said alarm switches being connected in series with a battery and an electrically operated alarm; each of the heating coils on each of said thermostatic arms being connected to the other terminal of said battery in said vehicle and to one of said three conductors within said arcuate switch body.

2. An awakener for drivers of vehicles having a steering wheel and a battery composed of an arcuate switch body of insulating material attached to said steering wheel having an inner arcuate channel, a switching mechanism operating within said channel, including a live conductor and three conductors leading to three heating coils, respectively, of three thermostatic switches, having means to open circuits through any two of the heating coils of said switches, and open the circuit through the third conductor as the steering wheel is rotatively moved from side to side while the vehicle is operated; said thermostatic switches being connected through said car battery to an electrically operated alarm; each of the thermostatic switches being normally closed to sound said alarm, and being adapted to open the alarm circuit when heated by said heating coil and to stay open a predetermined time after the heating coil is disconnected.

References Cited in the file of this patent

UNITED STATES PATENTS

| | | |
|---|---|---|
| 1,843,825 | Butler | Feb. 2, 1932 |
| 2,673,906 | Lewis | Mar. 30, 1954 |